(12) United States Patent
Gu-Stoppel et al.

(10) Patent No.: US 10,095,023 B2
(45) Date of Patent: Oct. 9, 2018

(54) APPARATUS COMPRISING A SPRING AND AN OPTICAL ELEMENT SUSPENDED THEREON

(71) Applicant: Fraunhofer-Gesellschaft zur Foerderung der angewandten Forschung e.V., Munich (DE)

(72) Inventors: Shanshan Gu-Stoppel, Itzehoe (DE); Dirk Kaden, Elmshorn (DE); Christian Eisermann, Elmshorn (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 1005 days.

(21) Appl. No.: 14/289,446

(22) Filed: May 28, 2014

(65) Prior Publication Data

US 2014/0355092 A1    Dec. 4, 2014

(30) Foreign Application Priority Data

May 29, 2013 (DE) .......... 10 2013 210 059

(51) Int. Cl.
| | |
|---|---|
| G02B 26/08 | (2006.01) |
| G02B 26/10 | (2006.01) |
| G02B 26/12 | (2006.01) |
| G02B 7/182 | (2006.01) |

(52) U.S. Cl.
CPC .......... G02B 26/08 (2013.01); G02B 7/1821 (2013.01); G02B 26/0858 (2013.01)

(58) Field of Classification Search
CPC . G02B 7/08; G02B 7/026; G02B 7/04; G02B 7/09; G02B 7/023; G02B 27/646; G02B 7/102; G02B 7/02; G02B 7/021; G02B 7/003; G02B 7/10; G02B 7/022; G02B 7/025; G02B 7/028; G02B 7/14; G02B 13/001; G02B 7/008; G02B 7/28
USPC .................................................. 359/811–830
See application file for complete search history.

(56) References Cited

U.S. PATENT DOCUMENTS

| | | | |
|---|---|---|---|
| 5,579,148 A | 11/1996 | Nishikawa et al. | |
| 6,749,308 B1 | 6/2004 | Niendorf et al. | |
| 6,830,944 B1 * | 12/2004 | Smits | B81B 3/0018 347/54 |
| 7,969,637 B1 * | 6/2011 | Fu | G02B 26/0841 359/224.1 |
| 8,238,011 B1 | 8/2012 | Fu et al. | |

(Continued)

FOREIGN PATENT DOCUMENTS

| | | |
|---|---|---|
| CA | 2426421 | 5/2002 |
| CN | 101221283 A | 7/2008 |
| EP | 1806613 A1 | 7/2007 |

OTHER PUBLICATIONS

Izhar, Umer et al., "Multi-axis micromirror for optical coherence tomography", Procedia Cemistry, vol. 1, Issue 1, Sep. 2009, Seiten 1.147-1.150.

*Primary Examiner* — Thomas K Pham
*Assistant Examiner* — Sharrief Broome
(74) *Attorney, Agent, or Firm* — Perkins Coie LLP; Michael A. Glenn

(57) ABSTRACT

Apparatuses with actuators having actuator-side attachment areas disposed thereon, an optical element having mirror-side attachment areas disposed thereon and springs are described, wherein an optical element is connected to actuators via two or four springs.

9 Claims, 14 Drawing Sheets

(56) References Cited

U.S. PATENT DOCUMENTS

| | | | |
|---|---|---|---|
| 2004/0037492 A1 | 2/2004 | Starr et al. | |
| 2004/0160118 A1 | 8/2004 | Knollenberg et al. | |
| 2004/0182997 A1* | 9/2004 | Green | G02B 27/646 |
| | | | 250/227.14 |
| 2008/0165402 A1 | 7/2008 | Nakamura et al. | |
| 2010/0097681 A1 | 4/2010 | Klose et al. | |
| 2010/0195180 A1* | 8/2010 | Akanuma | G02B 26/0858 |
| | | | 359/200.8 |
| 2010/0277783 A1 | 11/2010 | Takahashi | |
| 2010/0309536 A1 | 12/2010 | Akanuma et al. | |
| 2012/0320379 A1* | 12/2012 | Hofmann | G02B 26/0841 |
| | | | 356/445 |

* cited by examiner

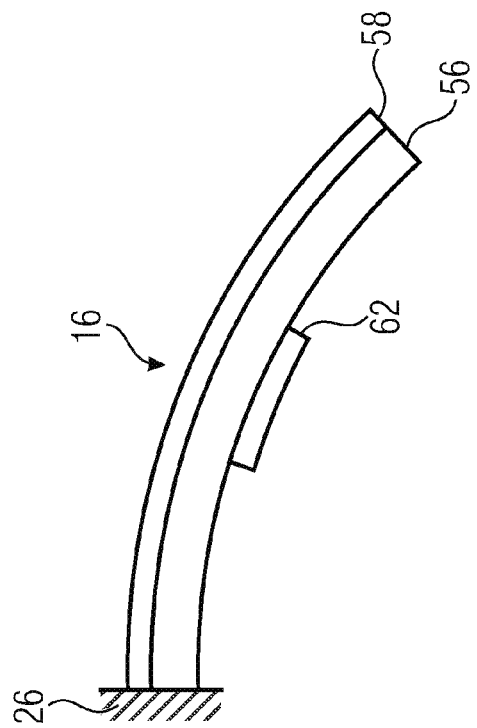
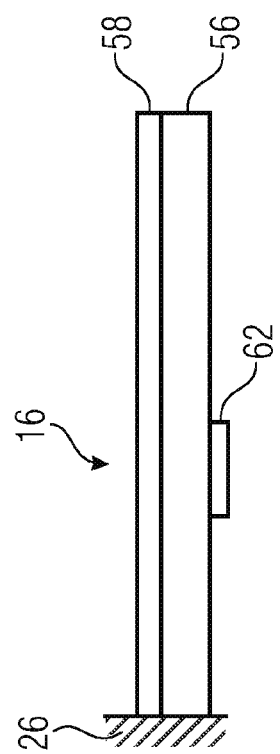
FIG 7B
FIG 7A

APPARATUS COMPRISING A SPRING AND AN OPTICAL ELEMENT SUSPENDED THEREON

CROSS-REFERENCE TO RELATED APPLICATIONS

This application claims priority from German Patent Application No. 10 2013 210 059.0, which was filed on May 29, 2013, and is incorporated herein in its entirety by reference.

BACKGROUND OF THE INVENTION

The present invention relates to an apparatus comprising an optical element mounted on actuators in a tiltable manner via springs.

Typically, bimorph actuators consist of an active and a passive layer, wherein the actuators use different, for example, thermal or piezoelectric expansion or contraction characteristics of the layer materials to effect deflections of the actuators.

In most cases, systems comprising bimorph actuators and an optical element tiltable with large deflections around an axis in a quasi statical manner, for example a micro mirror, necessitate very large component surfaces of the systems, since the deflection of such bimorph actuators and hence the deflection of the optical element depends, among others, on the length of the actuators. An optical element deflected around two torsion axes perpendicular to each other has an even higher space requirement, since additional actuators are disposed. A higher space requirement is a significant disadvantage for MEMS devices.

One embodiment of a micro mirror having two torsion axes perpendicular to each other, which is operated in a quasi statical manner in both torsion axes or the resulting rotating movements is illustrated in FIGS. 2a and 2b for thermally deflectable actuators and can also be used, for example, for piezoelectrically deflectable actuators.

FIG. 2a shows an apparatus comprising an optical element 12', which is mounted on four actuators 16a-d perpendicular to each other via four springs 14'a-d folded several times, tiltable around the torsion axes 18a and 18b. Heating elements 52a-d are disposed on the actuators 16a-d, which are implemented to heat the actuators 16a-d locally, wherein locally varying coefficients of thermal expansion of actuator layers, when the actuators 16a-d are heated, result in a deflection of the actuators 16a-d and hence in a deflection of the optical element 12'.

The deflection allows relatively large tilting angles of the optical element 12', however, the actuators 16a-d are implemented in a long manner in relation to the length of the edges of the optical element 12', which increases the space requirements of the actuators and hence of the apparatus. Additionally, springs 14'a-d show a large axial expansion. All in all, the space efficiency of the apparatus is low. Since an enlargement of an optical effective area of the optical elements 12' is also accompanied by enlarged actuators 16a-d and springs 14'a-d, this design is unsuitable for optical elements having large surfaces.

FIG. 2b shows the apparatus of FIG. 2a in a deflected state. The actuators 16a-d are deflected such that the optical element 12' is tilted around the torsion axis 18a.

The structure of this apparatus is described in [1] for optical coherence tomography.

Accordingly, an apparatus allowing titling of large optical elements with large space efficiency and enabling a compact structure would be desirable.

SUMMARY

According to an embodiment, an apparatus may have: a first actuator; a second actuator; an optical element; at least one first spring disposed between the first actuator and the optical element; at least one second spring disposed between the second actuator and the optical element; wherein the optical element includes exactly two spaced-apart optics-side attachment areas; and wherein the at least one first spring is disposed on the first optics-side attachment area and the at least one second spring is disposed on the second optics-side attachment area, such that actuation of the first or second actuator causes tilting of the optical element around two axes.

According to another embodiment, an apparatus may have: a first actuator; a second actuator; a third actuator; a fourth actuator; an optical element; at least one first spring disposed between the first actuator and the optical element; at least one second spring disposed between the second actuator and the optical element; at least one third spring disposed between the third actuator and the optical element; at least one fourth spring disposed between the fourth actuator and the optical element; wherein each of the first to fourth springs is disposed at an angle to the extension direction of the allocated actuators that is greater than 90° and less than 180°.

According to another embodiment, an apparatus may have: a first actuator; a second actuator; an optical element; at least one first spring disposed between the first actuator and the optical element; at least one second spring disposed between the second actuator and the optical element; a control unit implemented to control the actuators; wherein the optical element includes exactly two spaced-apart optics-side attachment areas; and wherein the at least one first spring is disposed on the first optics-side attachment area and the at least one second spring is disposed on the second optics-side attachment area, such that an actuation of the first or second actuator causes tilting of the optical element around two axes; and wherein the control unit is further implemented to effect tilting of the optical element in a direction differing from the two axes.

According to another embodiment, an apparatus may have: a first actuator; a second actuator; a third actuator; a fourth actuator; an optical element; at least one first spring disposed between the first actuator and the optical element; at least one second spring disposed between the second actuator and the optical element; at least one third spring disposed between the third actuator and the optical element; at least one fourth spring disposed between the fourth actuator and the optical element; a control unit that is implemented to control the actuators; wherein each of the first to fourth springs is disposed at an angle to the expansion direction of the allocated actuator that is greater than 90° and less than 180°; and wherein the control unit is further implemented to effect tilting of the optical element in a direction differing from the two axes.

Thus, it is the basic idea of the present invention to have realized that the above object can be solved both in that an optical element is mounted on actuators at exactly two optics-side attachment areas via springs, tiltable around first and second axes, and in that an optical element is mounted on actuators at four optics-side attachment areas via springs, tiltable around two axes, wherein one spring each is disposed on an actuator at an angle between 90° and 180°.

According to an embodiment, an optical element is suspended in a tiltable manner via two springs disposed between the optical element and one actuator each, wherein the springs are implemented in a straight manner and comprise a short axial expansion. Thereby, the apparatus has great space efficiency.

According to an alternative embodiment, at least one further spring is disposed on an optics-side attachment area, such that the optical element is stabilized and can be dimensioned larger.

According to a further embodiment, the optical element is disposed on actuators via four springs implemented in a straight manner, such that tilting of the optical element due to a large weight of the optical element is minimized.

According to an alternative embodiment, the springs comprise a curvature or a bend.

BRIEF DESCRIPTION OF THE DRAWINGS

Embodiments of the present invention will be detailed subsequently referring to the appended drawings, in which:

FIG. 2b is a deflected state of the apparatus of FIG. 2a;

FIG. 7a is a schematic side sectional view of an actuator having a functional layer and a measurement element in a non-deflected state;

FIG. 7b is a schematic sectional side view of the actuator of FIG. 7a in a deflected state;

DETAILED DESCRIPTION OF THE INVENTION

Figure 1:
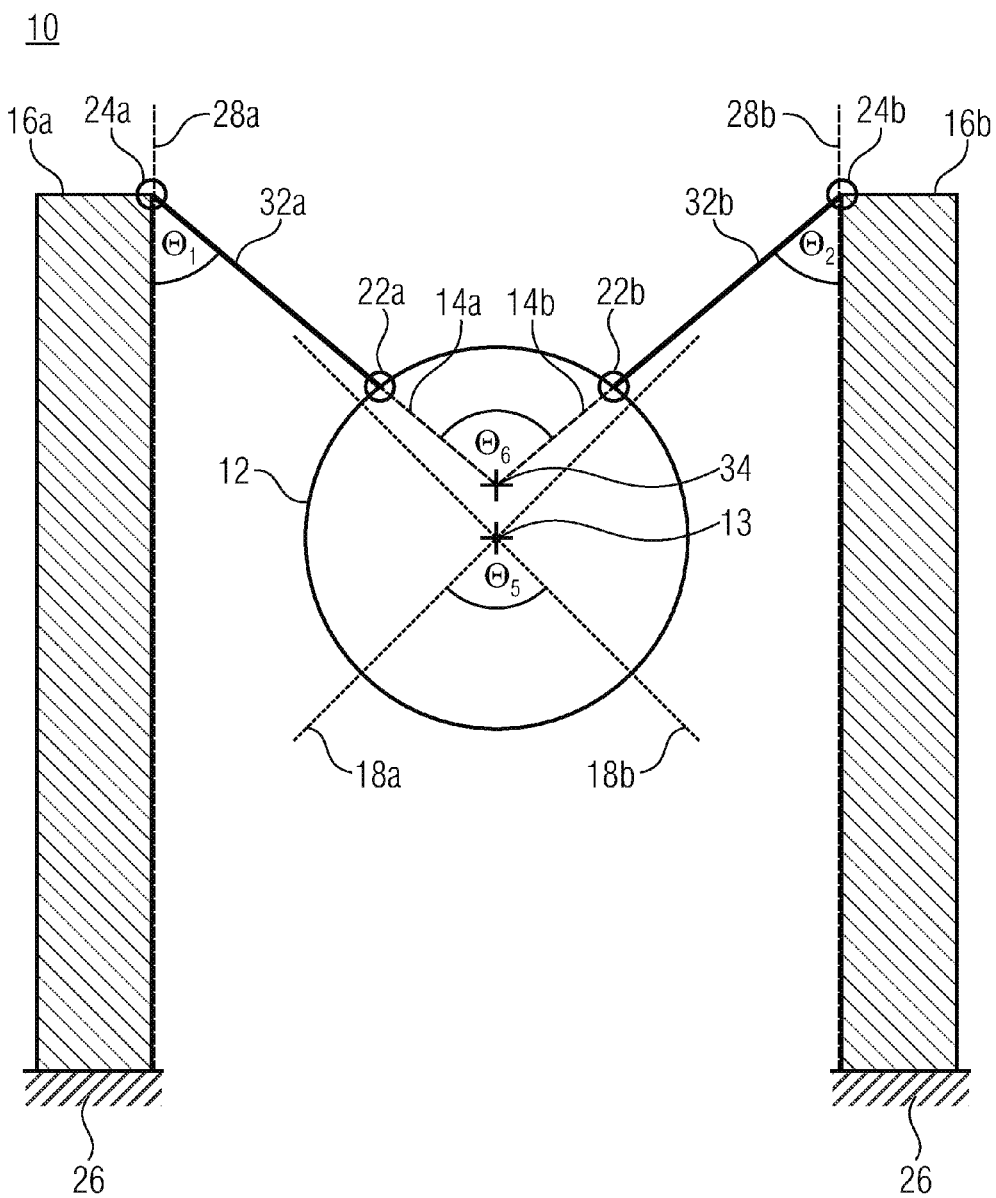
FIG. 1 is a top view of an apparatus comprising an optical element mounted on actuators at two optics-side attachment areas in a tiltable manner.
Figure 2A:
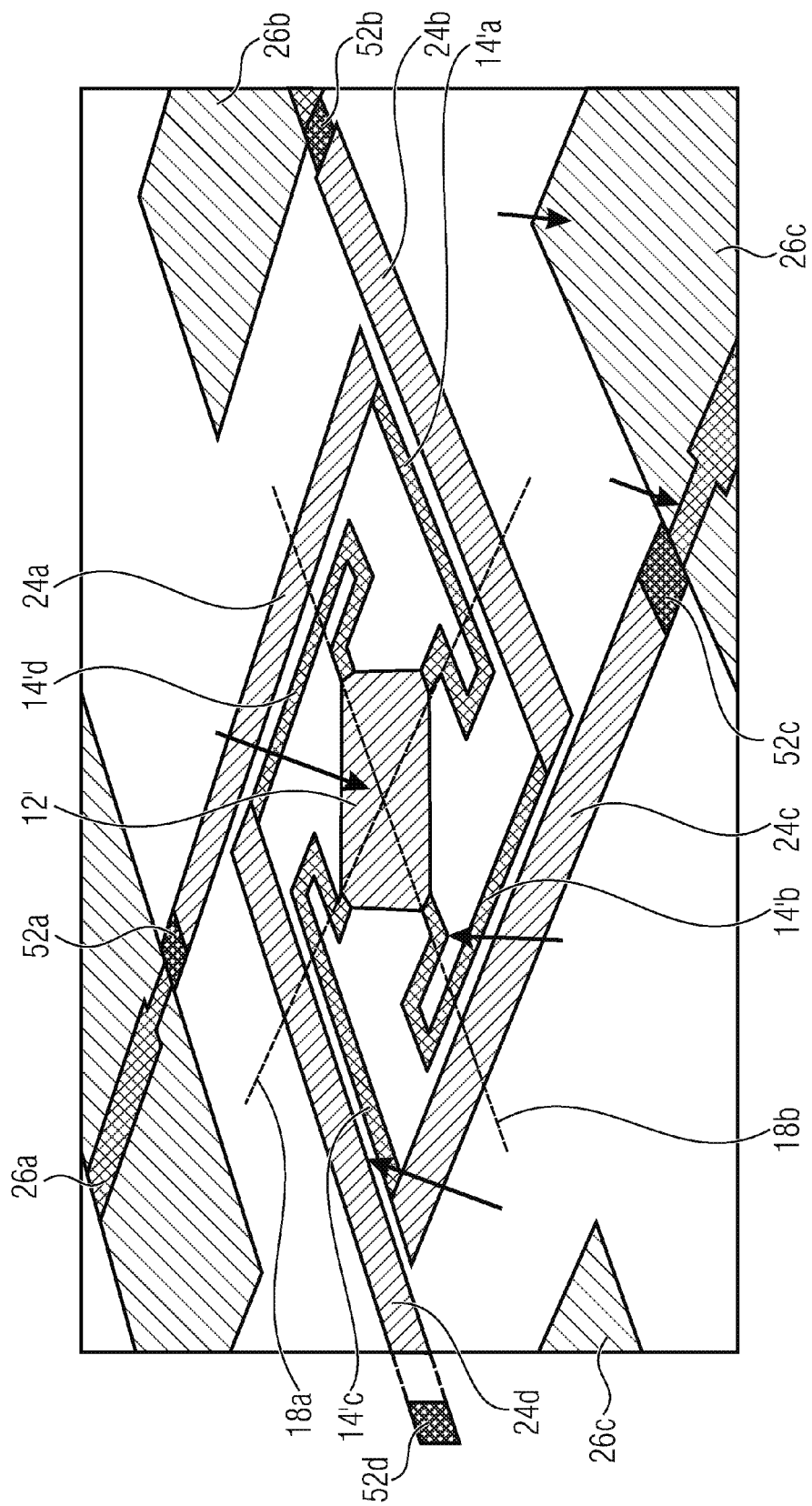
FIG. 2a is a top view of an apparatus comprising an optical element that is mounted in a tiltable manner according to conventional technology.
Figure 2B:
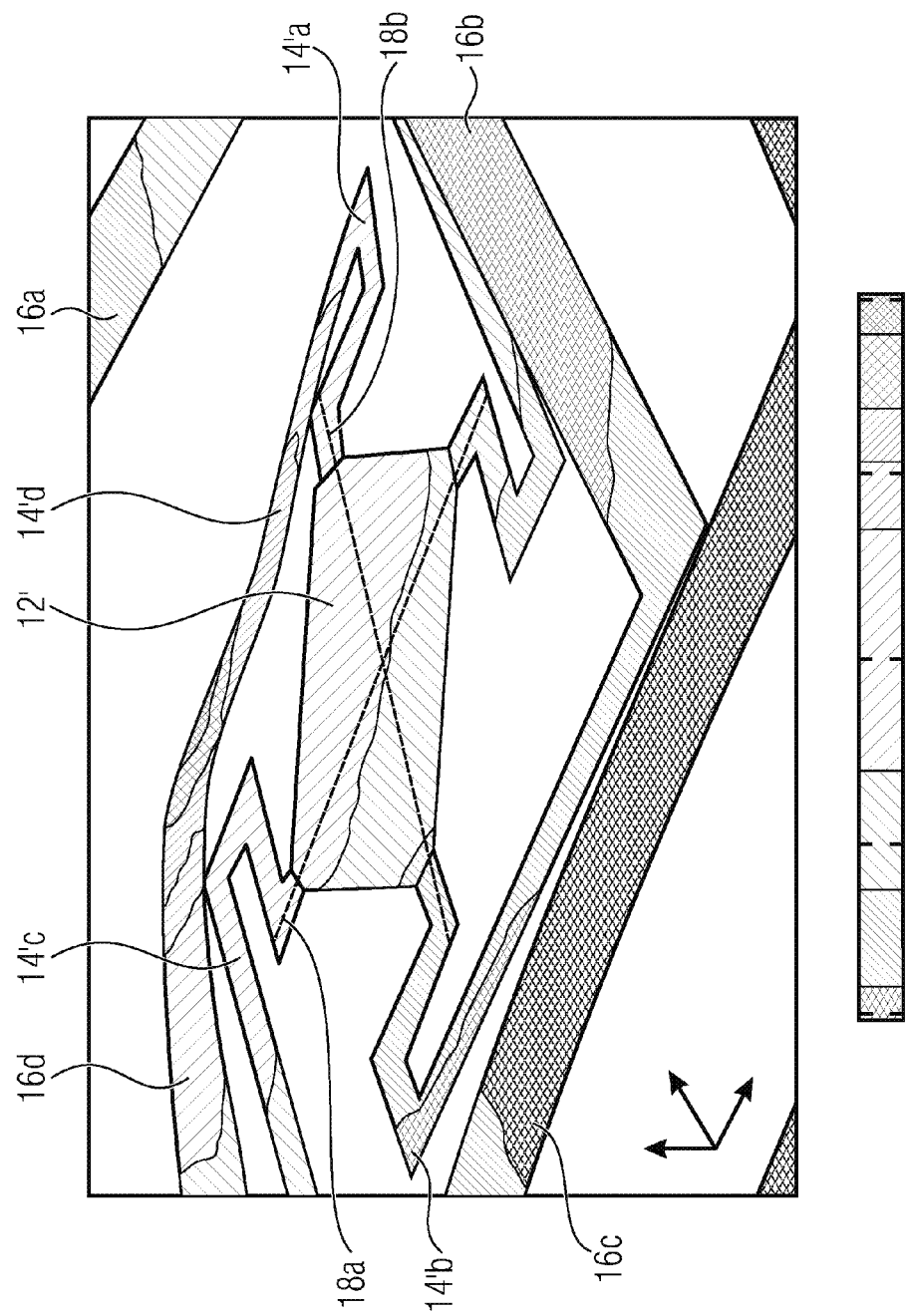

FIG. 1 shows an apparatus 10 having a round optical element 12 whose main side comprises a centroid 13 and is mounted on actuators 16a and 16b via springs 14a and 14b, tiltable around a first torsion axis 18a and a second torsion axis 18b, and the torsion axes 18a and 18b intersects at an angle $\theta_5$ adjacent to the centroid 13. The springs 14a or 14b are connected, at a first end facing the optical element 12, at an optics-side attachment area 22a or 22b, and, at a second end facing the respective actuator 16a or 16b, at actuator-side attachment areas 24a or 24b, to the optical element 12 or the actuators 16a or 16b. The optics-side attachment areas 22a and 22b comprise lateral expansions along a circumference of the main side of the optical element 12 which are each less than 10% of the circumference of the main side.

The actuators 16a and 16b are firmly cantilevered at a fixing 26 and implemented to be deflected from a resting position at the end disposed opposite to the stationary fixing 26 during actuation, wherein an axial expansion of the actuators 16a and 16b corresponds to approximately more than 2.5 times the diameter of the main side of the optical elements 12.

The number of actuators 16a and 16b corresponds to the number of optics-side attachment areas 22a and 22b, such that each optics-side attachment area 22a and 22b can be allocated to an actuator 16a and 16b to which the same is connected via at least one spring 14a or 14b.

The actuator 16a comprises an actuator course 28a in an expansion direction starting from the stationary fixing 26 to the actuator-side attachment area 24a. Analogously, the actuator 16b comprises an actuator course 28b from the stationary fixing 26 towards the actuator-side attachment area 24b. A spring course 32a along an axial expansion from the first to the second end of the spring 14a intersects a spring course 32b along an axial expansion from the first to the second end of the spring 14b at an intersection 34 which is spaced apart from the centroid 30 at an angle $\theta_6$ of approximately 100°. An angle $\theta_1$ describes an orientation of the spring 14a to the actuator 16a and hence the angle of intersection of the two courses 28a and 32a, analogously, an angle $\theta_2$ describes an orientation of the spring 14b to the actuator 16b and hence the angle of intersection of the two courses 28b and 32b.

The angle $\theta_5$, at which the torsion axes 18a and 18b intersect, depends on the spring length along an axial expansion from the first end towards the second end of the springs 14a or 14b as well as the angles $\theta_1$ and $\theta_2$.

A distance between the intersection 34 of the spring courses and the centroid 13 has the effect that effectively reflecting edge lengths of the optical element 12, each describing a largest distance of two points of the optical element 12 along a straight line perpendicular to any torsion axis, are shorter than geometric edge lengths of the optical element describing a largest distance of two arbitrary points within the optical element, wherein this deviation is stored in a lookup table for an actuator control and can hence be corrected.

With a geometric adaptation as shown in FIG. 1, two-dimensional tilting of the optical element 12 around two torsion axes 18a and 18b is possible by using merely two actuators 16a and 16b.

A deflection of an actuator 16a or 16b results in tilting of the optical element 12 around the torsion axis 18a or 18b. Tilting the optical element 12 around the respectively different torsion axis 18a or 18b can be minimized by a geometric adaptation of the apparatus, wherein the angle $\theta_6$ is less than 180°.

While the intersection 34 is disposed within the main side of the optical element 12 in FIG. 1, embodiments comprise apparatuses where the intersection 34 is disposed outside the optical element 12.

The embodiment offers large space efficiency for systems having optical elements necessitating two-dimensional torsion movements and large optical effective areas or mirror areas. The two-dimensional movement is enabled by an adapted suspension of the optical element via springs, such that the two-dimensional movement can be obtained by merely two actuators.

Additionally, the embodiment is also mechanically very efficient. Since the deflection of the actuators strongly depends on their length, efficient transfer of the actuator deflection to the optical element is advantageous and decides the ratio between tilting angle of the optical element to necessitated component surfaces of the system.

The connecting springs in an apparatus having four actuators according to conventional technology frequently have to be implemented in a long and, partly, multiple-times curved manner, since the movement of an optical element connected to four reference points is limited by one or two of these reference points, while the optical element is deflected via the other reference points. Thus, the springs of the deflecting reference points have to be long and hence soft to allow the movement of the optical element. Hence, reciprocal tilting of the optical element necessitates also a respective long or soft implementation of all springs. Here, it is a disadvantage that the deflection of the actuators from very long or folded springs can only be transferred to a limited extent.

In the embodiment of FIG. 1, however, the optical element is connected to actuators only via two optics-side attachment areas, such that the movement of the optical element is not restricted. Thus, the springs between actuators and optical elements can be short to transfer the deflection of the actuators in an efficient manner and to optimize the dimensions of both the actuators and the springs, wherein space efficiency increases with respect to an unamended large optical element.

Alternative embodiments include actuators comprising an axial expansion that is greater than the diameter of the optical element and less than five times the diameter.

Figure 3:
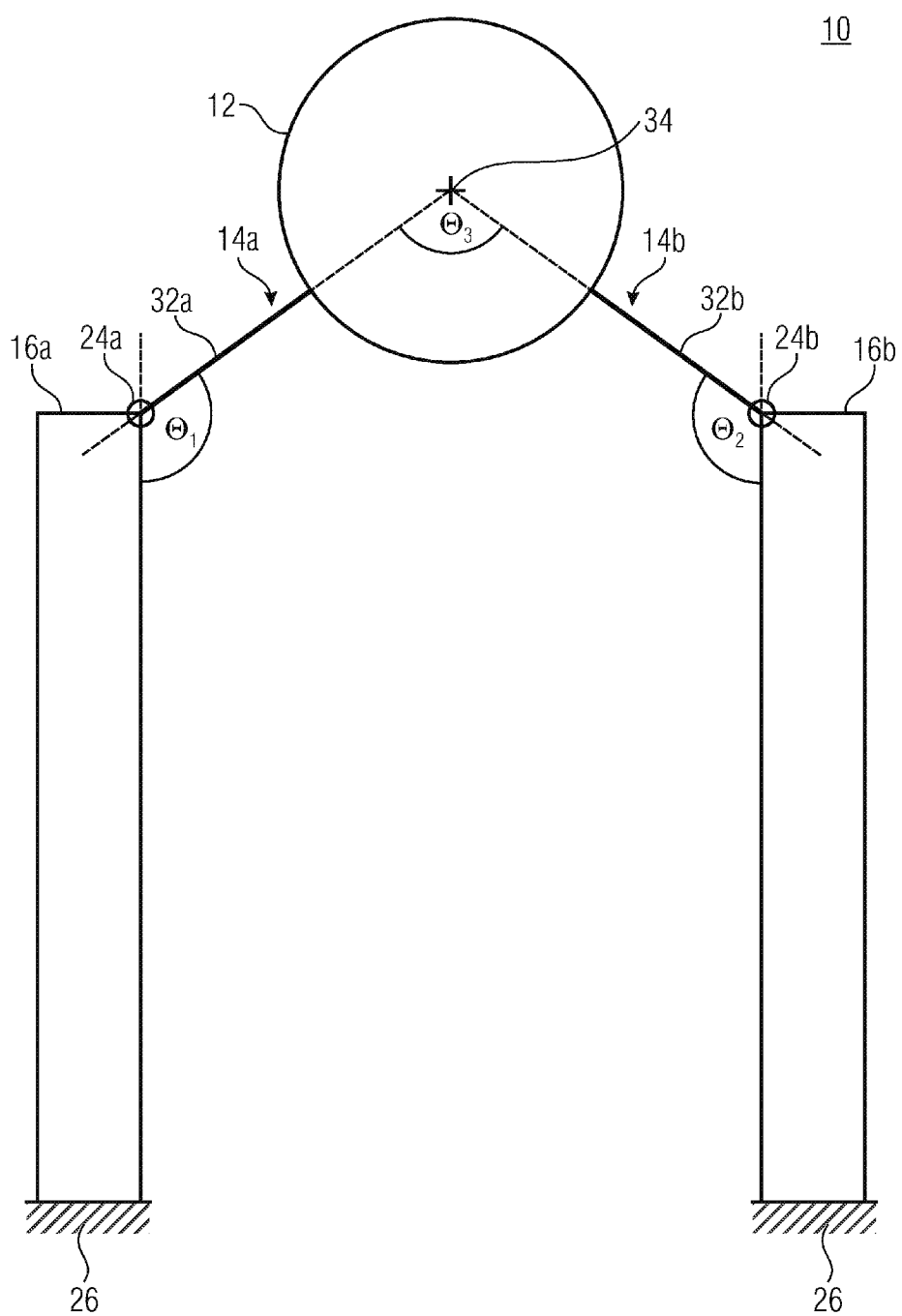
FIG. 3 is a schematic illustration of an apparatus analogous to FIG. 1 where the optical element comprises a larger distance to a fixing than actuator-side attachment areas.

FIG. 3 shows and apparatus 10 analogously to FIG. 1, wherein the optical element 12 is disposed at a larger distance to the stationary fixing 26 than the actuator-side attachment areas 24a and 24b. Angles $\theta_1$ and $\theta_2$ each comprise an angle greater than 90°, wherein the angle $\theta_2$ is less than 180°, analogously to FIG. 1.

Such an arrangement of the optical element 12 can be advantageous when, for example, an optical radiation to be deflected would be obstructed by an assembly according to FIG. 1, in that actuators 16a and 16b block optical transmission paths.

Figure 4:
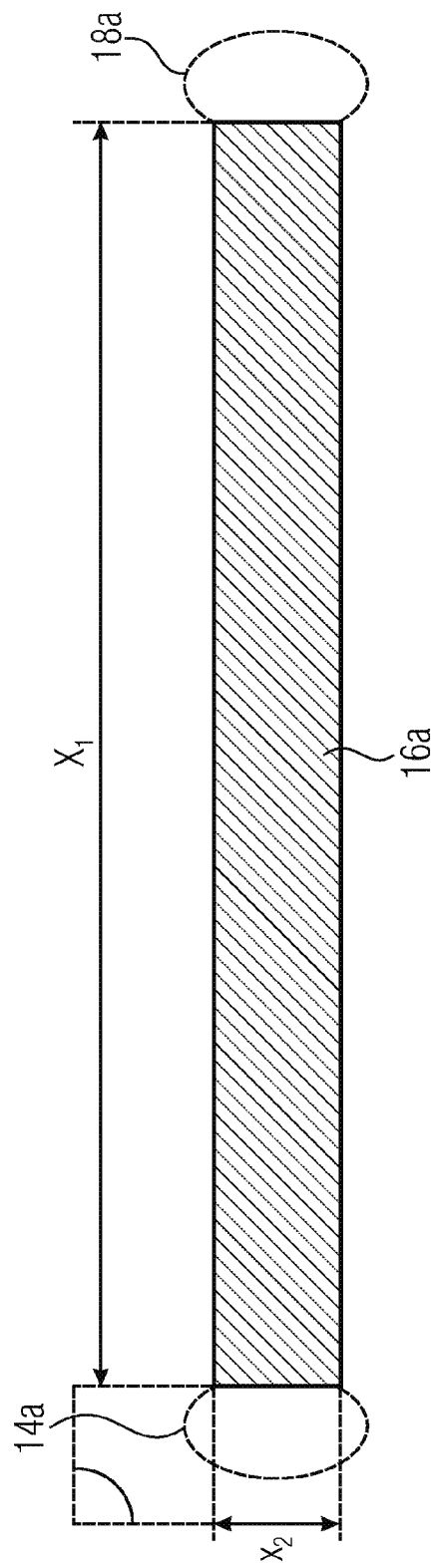
FIG. 4 is a schematic sectional side view of a spring.

FIG. 4 shows a top view of the spring 14a of the apparatus 10 of FIG. 1. The spring 14a includes an axial expansion $x_1$ from the first end to the second end of the spring 14a and a lateral expansion $x_2$ disposed perpendicular to the axial expansion $x_1$. The lateral expansion $x_2$ is less than the lateral expansion $x_1$ multiplied by a factor 0.3, such that the spring has a large axial length with respect to a lateral width. The expansion $x_1$ is less than twice the largest difference of two arbitrary points of a main side of the optical element where the spring 14a is disposed.

Figure 5:
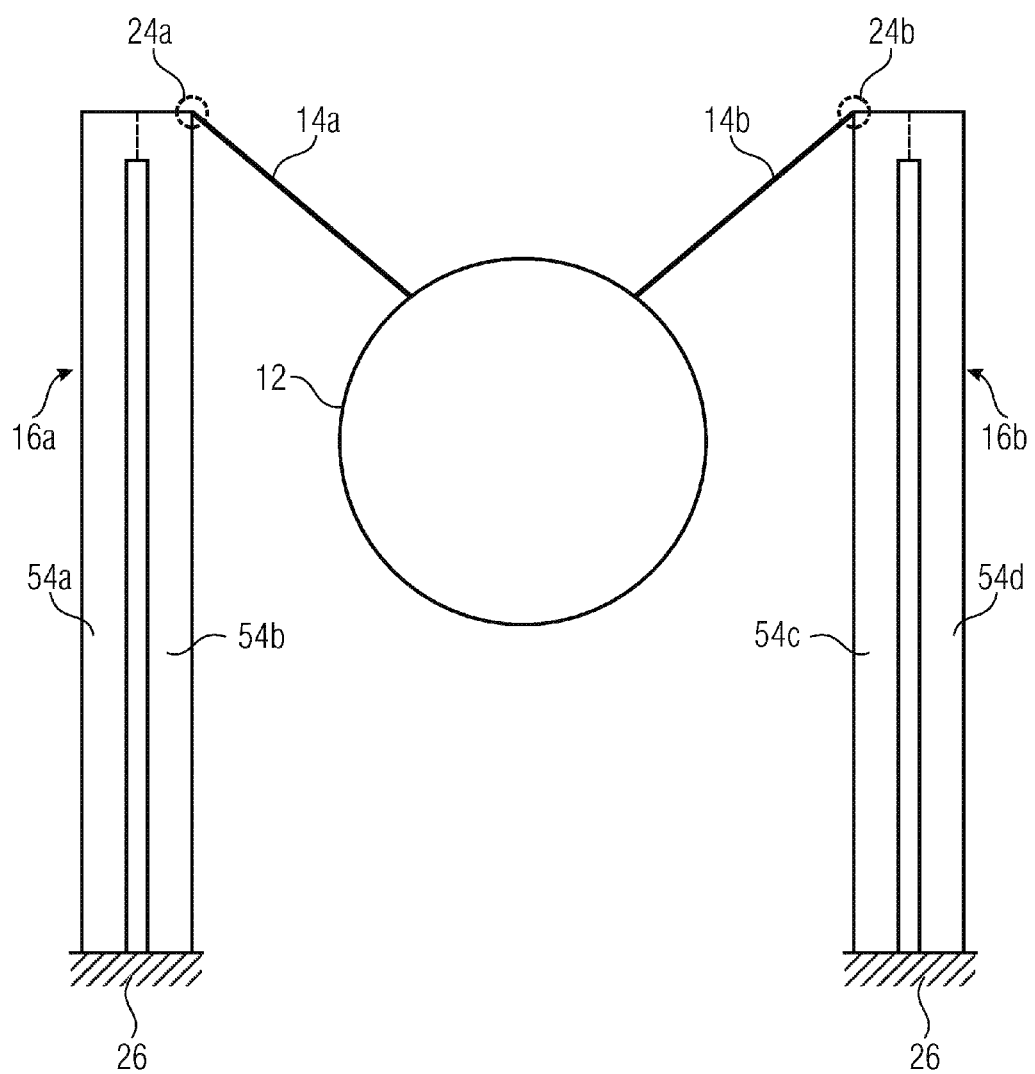
FIG. 5 is a schematic top view of an apparatus including actuators each including two actuator elements.

FIG. 5 shows an apparatus 20 where the actuators 16a and 16b each comprise two spaced-apart actuator elements 54a and 54b or 54c and 54d, wherein the actuator elements 54a and 54b or 54c and 54d are connected to each other at the deflectable end of the actuator 16a or 16b, such that a deflection of one of the actuator elements 54a or 54b or 54c or 54d results in a deflection of the actuator 16a or 16b, wherein the respective actuator elements 54a and 54b or 54c and 54d of an actuator can be controlled in parallel.

A combination of several actuator elements 54a-d allows a reduction of cross-contraction effects in piezoelectrically operated actuators, since a ratio of actuator length to actuator width is optimized for each actuator element.

Alternative embodiments show actuator elements that are disposed without distance to one another and comprise a common substrate, as well as actuator elements that can be controlled separately from one another.

Further embodiments show actuators having at least two actuator elements, wherein different actuator elements use different actuation principles in that one actuator element comprises a piezoelectric functional layer and another actuator element comprises a thermal functional layer.

Figure 6:
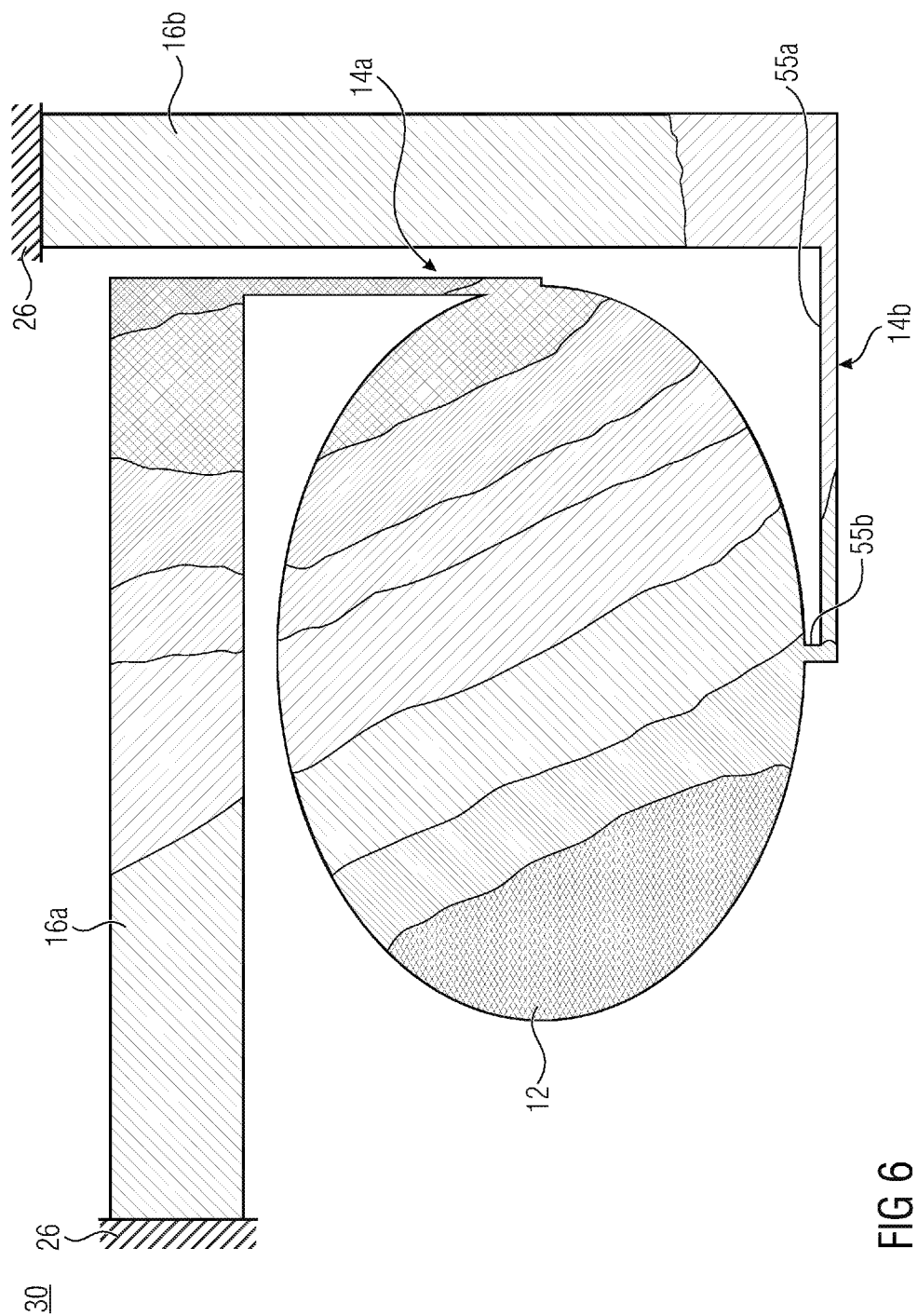
FIG. 6 is a top view of an apparatus where the actuators are disposed at an angle to each other.

FIG. 6 shows an apparatus 30 having an optical element 12 that is disposed on the actuator 16a and 16b in a tiltable manner via springs 14a and 14b, wherein the expansion direction of the actuators 16a and 16b are disposed perpendicular to one another.

The spring 14b comprises two portions 55a and 55b, each formed in a straight manner, wherein portion 55a is implemented in a long manner with respect to portion 55b and comprises approximately 97% of the whole expansion and portion 55b comprises approximately 3% of the whole expansion.

A combination of several axial portions having different lengths allows an efficient introduction of torsion moments into the spring.

Alternative embodiments show springs comprising more than two and a maximum of 6 straight portions, wherein the portions are individual, and one portion is implemented such that the same comprises at least 80% of the whole axial expansion of the spring course, and wherein each of the shorter portions includes a maximum proportion of 4% of the axial course of the respective spring.

FIG. 7a shows a side view of an actuator 16 in a non-deflected state. The actuator 16 includes a substrate 56 and a thermal functional layer 58 disposed on the substrate 56 via an axial expansion starting from the stationary fixing 26 to a deflectable end of the actuator 16. The functional layer 58 is implemented to have an expansion differing from the substrate 56 during heating, such that an end of the actuator 16 opposing the stationary fixing 26 is deflected. A strain measurement strip 62, which is implemented to detect a deflection of the actuator 16 and to provide the detected deflection in the form of a signal, is disposed on a side of the substrate 56 facing away from the functional layer 58.

FIG. 7b shows the actuator 16 in a deflected state where an expansion of the functional layer 58 results in a compression of the strain measurement strip 62.

In alternative embodiments, the functional layer comprises piezoelectric materials that are implemented to experience contraction or expansion when an electric voltage is applied, and to deflect the actuator based on the contraction or expansion.

Depending on the operating state of the actuators and hence depending on the expected material stress, other measurement methods for detecting the deflection state can be disposed on the actuators, for example, Bragg grids comprised in fiber-optic sensors.

Figure 8:
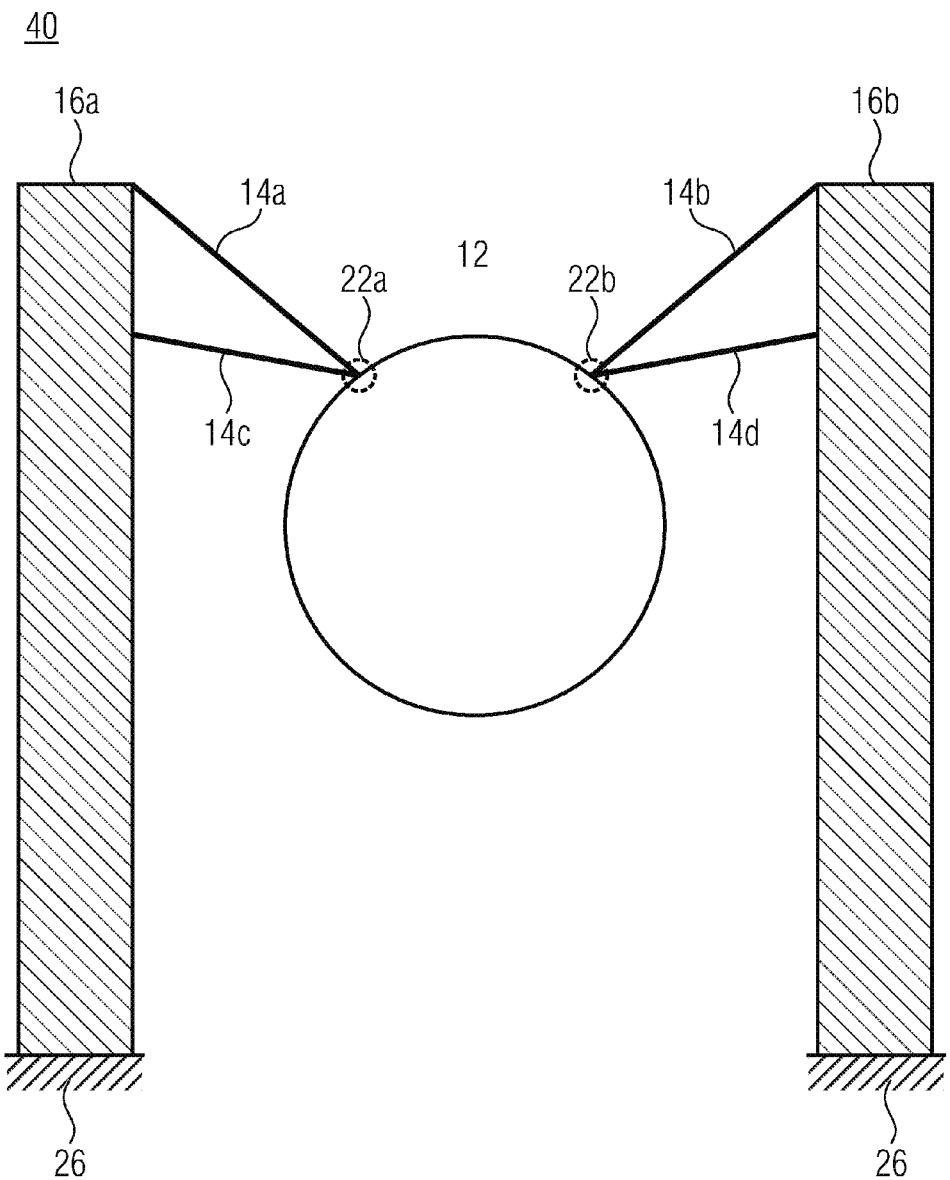
FIG. 8 is a top view of an apparatus where two springs each are disposed at an optics-side attachment location.

FIG. 8 shows a schematic top view of an apparatus 40, analogously to apparatus 10 of FIG. 1, where an additional spring 14d is disposed between the actuator 16a and the optical element 12, and an additional spring 14d is disposed between the actuator 16b and the optical element 12, wherein the springs 14a and 14c as well as 14b and 14c are each disposed in pairs on the optics-side attachment areas 22a and 22b, such that the number of supporting points on the optical element 12 is unamended, wherein the springs 14a-d each have the same lateral expansion.

An array of several springs allows a more efficient transfer of an actuator deflection to the optical element or additional stabilization of position of the optical element, such that weight-induced deflections of the optical element are reduced.

Figure 9:
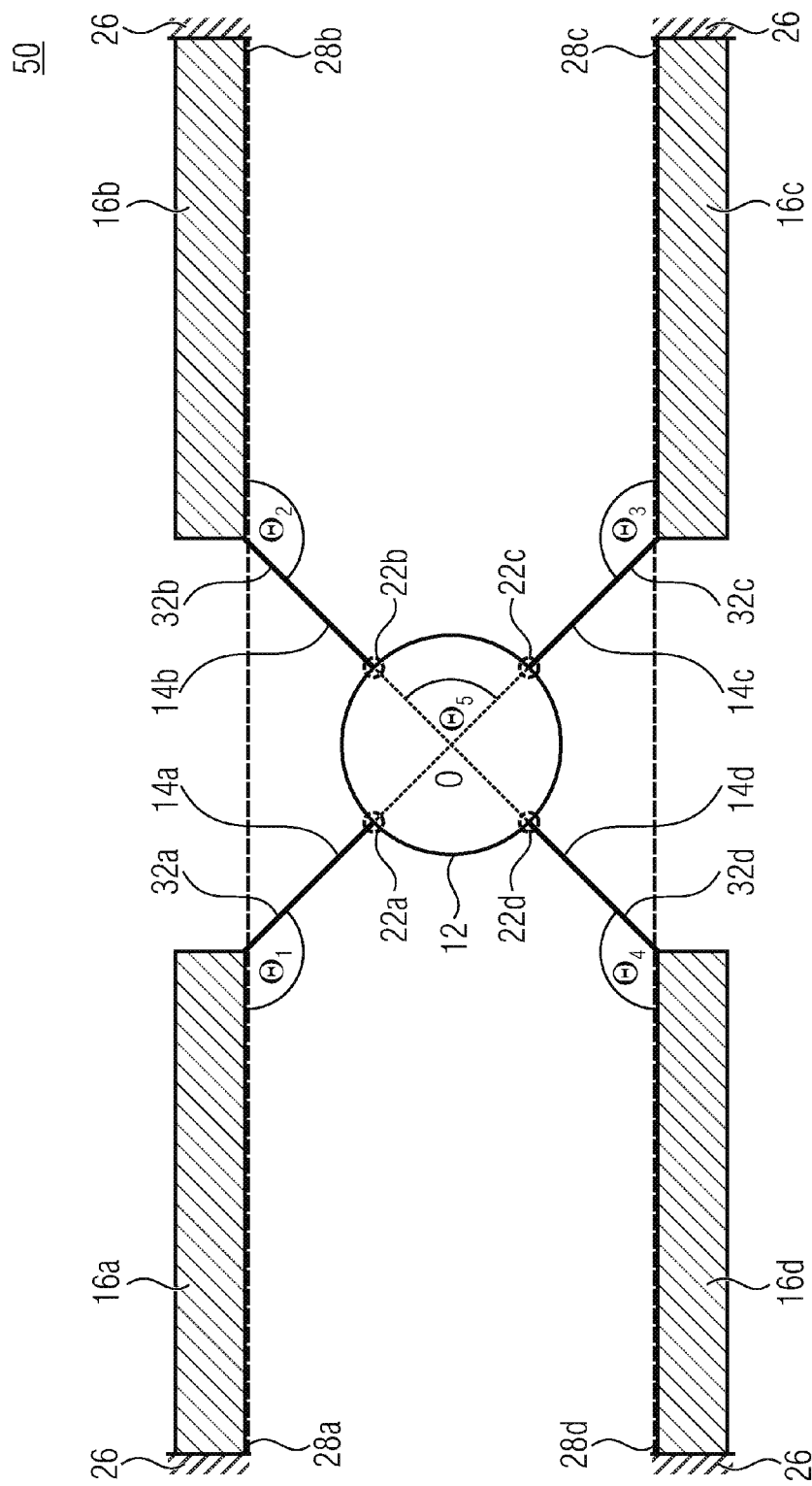
FIG. 9 is a top view of an apparatus comprising an optical element and four springs disposed on actuators at an angle.

FIG. 9 shows a top view of an apparatus 50 having four actuators 16a-d on which the optical element 12 is mounted via four springs 14a-d, tiltable around the two torsion axes 18a and 18b. The springs 14a-d are connected to the optical element 12 at four optics-side attachment areas 22a-d. The actuator course 28a-d of an actuator 16a-d forms an angle $\theta_1$, $\theta_2$, $\theta_3$, or $\theta_4$, with the spring course 32a-d of a spring 14a-d disposed on the respective actuator 16a-d. The actuators 16a-d are disposed such that the courses 28a and 28b as well as the courses 28b and 28c run parallel to each other and the course 28a is disposed congruently with the course 28b as well as the course 28d is disposed congruently with the course 28c. The angles $\theta_{1-4}$ define the position of the torsion axes 18a and 18b, wherein the two torsion axes 18a and 18b intersect at an angle $\theta_5$ and the angle $\theta_5$ is defined by the equation $$\theta_5 = 360° - (\theta_3 + \theta_4)$$

such that the directions in which the optical element 12 is deflectable can be geometrically defined by the arrangement of the springs 14a-d with respect to the actuators 16a-d and the optical element 12.

Figure 10:
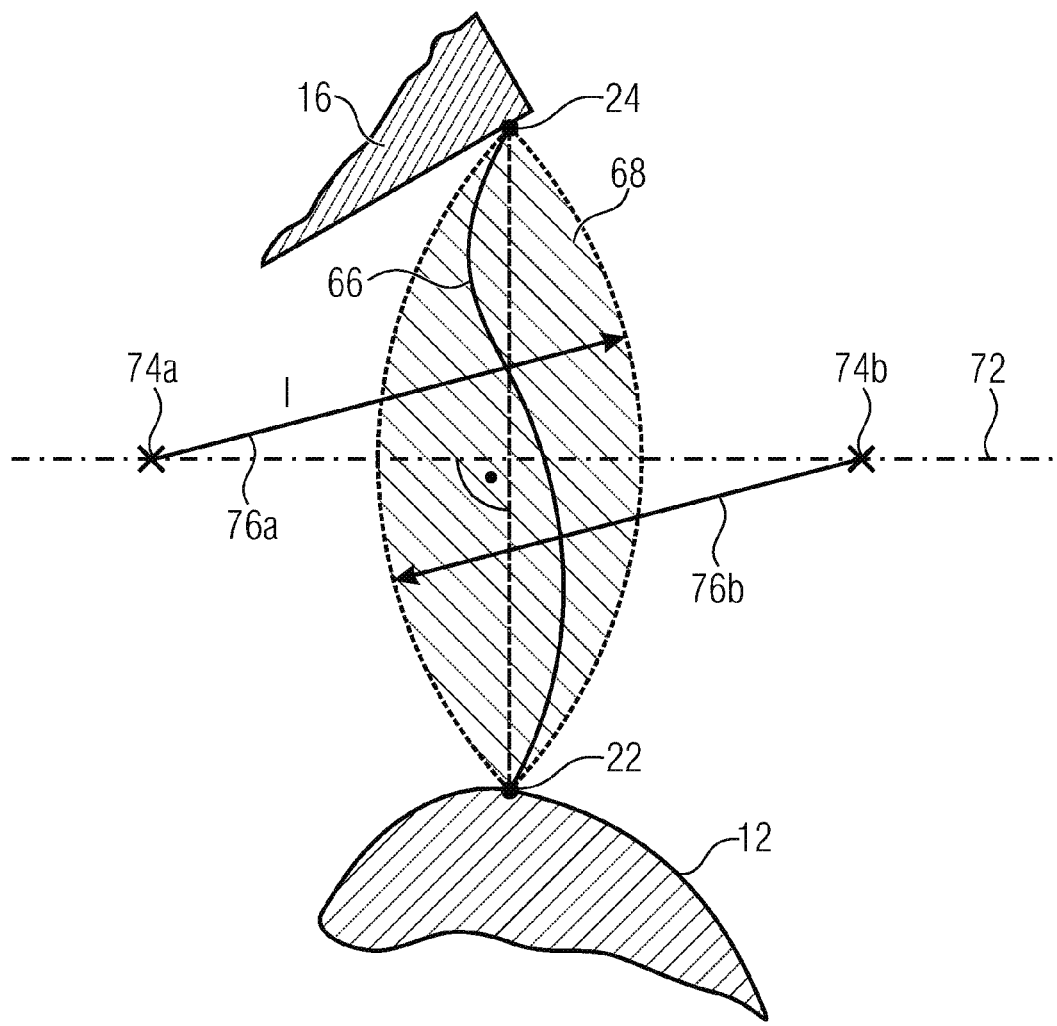
FIG. 10 is a top view of a curved spring.

FIG. 10 shows a top view of a spring 66 having a curved course. The curved course is implemented such that the spring is implemented within a spring area 68, wherein the spring area 68 is defined by an overlapping area of two circular arcs. An axis 72 is disposed between the actuator-side attachment area 24 and the optics-side attachment area 22 and intersects a connecting line between the attachment areas 24 and 22 at a right angle. The line 72 includes circular arc centers 74a and 74b, around which the circular arcs are disposed with a radius 76a and 76b such that the respective circular arcs intersect the two attachment areas 24 and 22, and wherein the radius 76a or 76b of the respective circular arc is greater than 75% of the distance of the two attachment areas 24 and 22 to each other.

Curved springs allow a reduction of torsion-induced material stress, such that a longer life span of the apparatus can be obtained.

As an alternative to the above embodiments showing springs having a constant lateral expansion across the spring course, alternative embodiments show apparatuses comprising springs having a lateral expansion varying across the spring course, as will be shown below.

Figure 11:
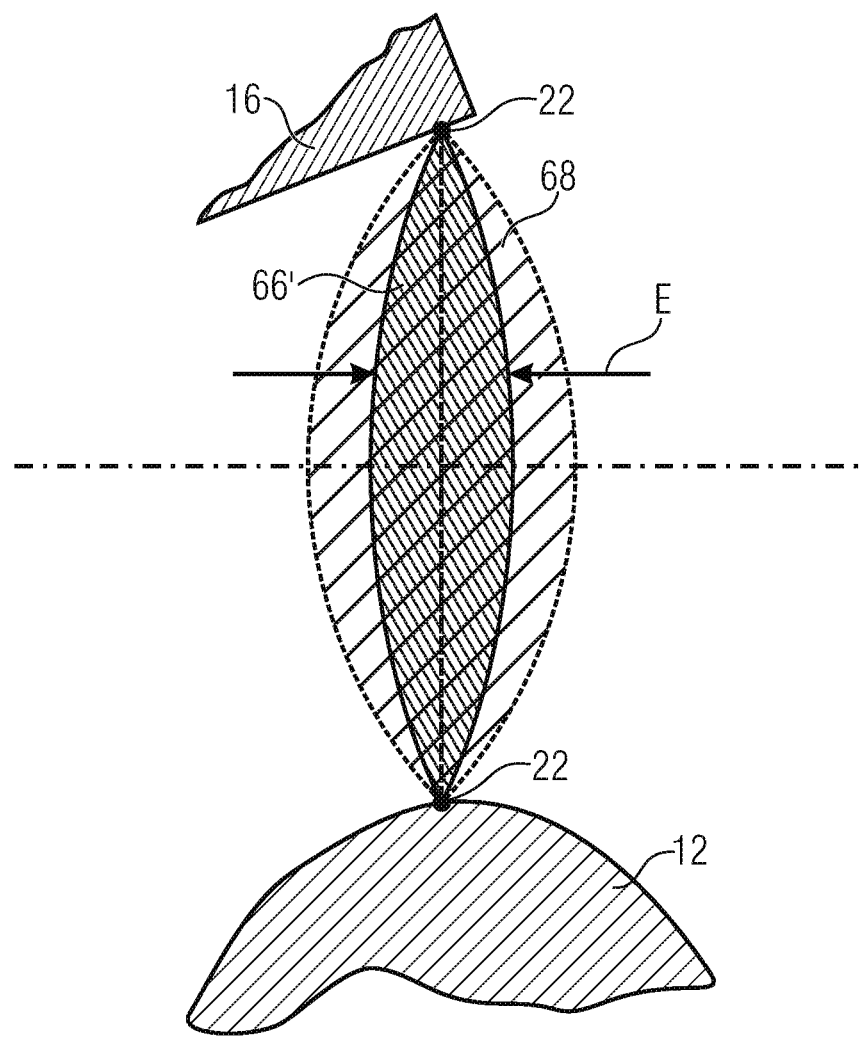
FIG. 11 is a top view of a spring having a variable lateral expansion.

FIG. 11 shows a top view of a spring 66' with a varying lateral expansion across an axial course from the optics-side attachment area 22 towards the actuator-side attachment area 24. The spring 66' is implemented within the area 68 such that a curved course of a spring 66 of FIG. 10 is comprised by the spring 66'.

A varying lateral expansion allows a defined reception of deformation energy across the axial course of the spring.

Figure 12:
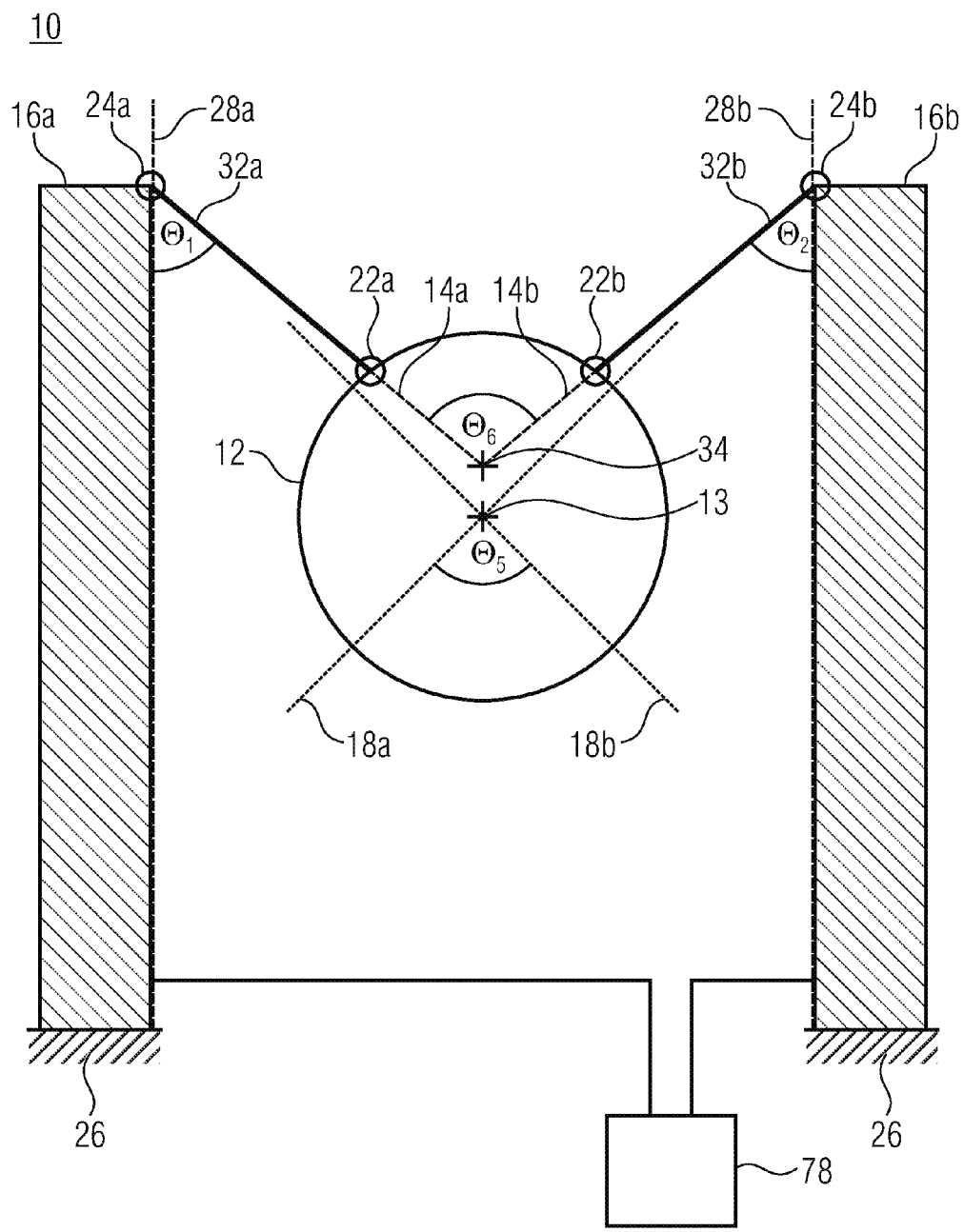
FIG. 12 is a top view of the apparatus of FIG. 1 further comprising a control unit implemented to deflect the actuators.

FIG. 12 shows the apparatus 10 of FIG. 1 having a control means 78 that is implemented to control the actuators 16a and 16b and to effect deflection of the actuators 16a and 16b such that the optical element 12 experiences tilting.

Figure 13:
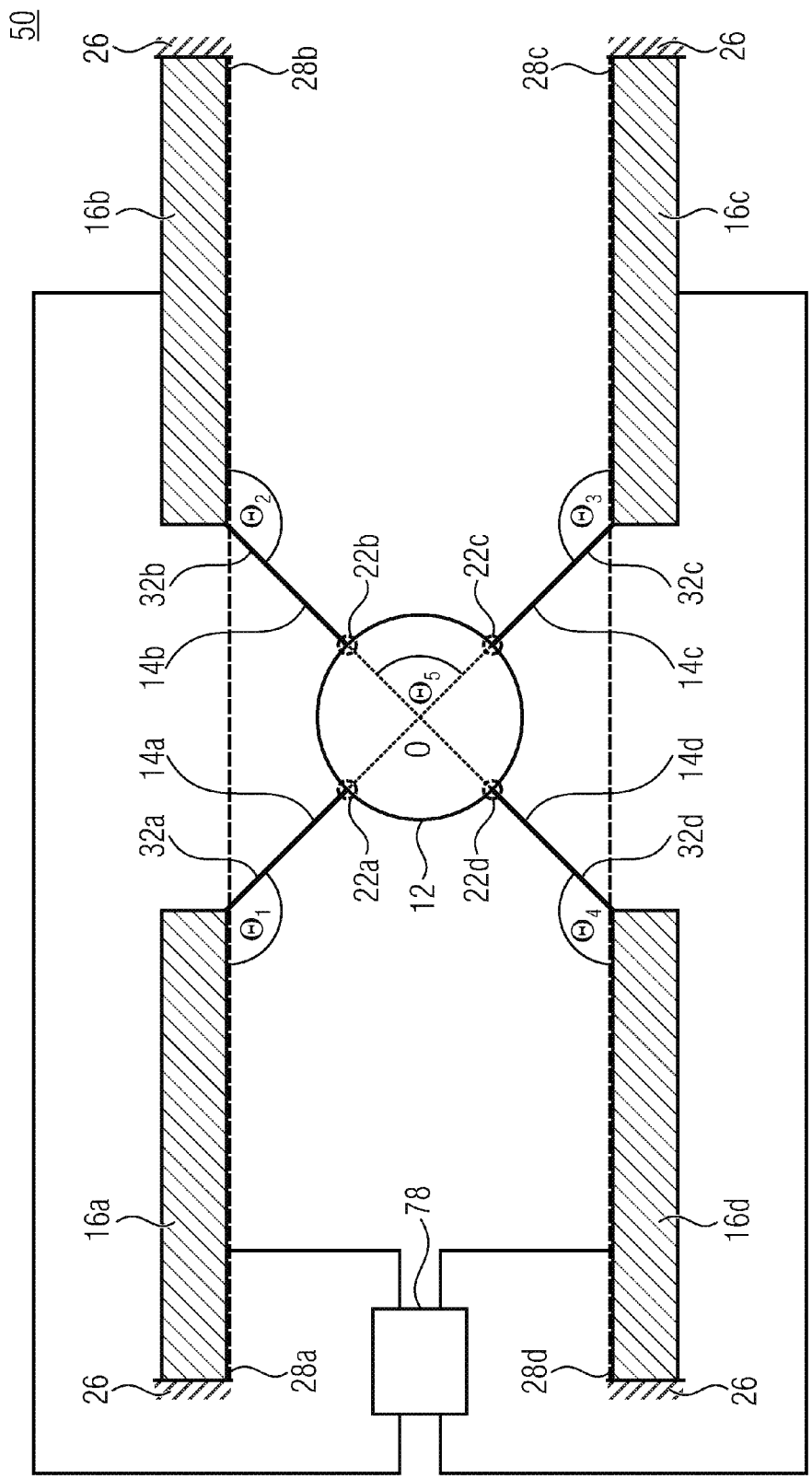
FIG. 13 is a top view of the apparatus of FIG. 9 further including a control unit implemented to deflect the actuators.

FIG. 13 shows the apparatus 50 of FIG. 9 having a control means 78 that is implemented to control the actuators 16a-d and to effect deflection of the actuators 16a-d such that the optical element 12 experiences tiling.

While the optical elements in the above embodiments are formed in a round manner, the optical elements can include any form or shape, for example elliptic or square.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

Literature

[1] Umer Izhar, Boon S. Ooi, Svetlana Tatic-Lucic, Multi-axis micromirror for optical coherence tomography, Procedia Chemistry, Volume 1, Issue 1, September 2009, Pages 1,147-1,150

The invention claimed is:

1. Apparatus, comprising:
   a first actuator;
   a second actuator;
   an optical element;
   at least one first spring disposed between the first actuator and the optical element;
   at least one second spring disposed between the second actuator and the optical element;
   wherein the optical element comprises exactly two spaced-apart optics-side attachment areas; and
   wherein the at least one first spring is disposed on the first optics-side attachment area and the at least one second spring is disposed on the second optics-side attachment area, such that actuation of the first or second actuator causes tilting of the optical element around two axes;
   wherein the first spring is disposed on a first actuator-side attachment area on the first actuator and the second spring is disposed on a second actuator-side attachment area on the second actuator;
   wherein expansions of lines between the first actuator-side attachment area and the first optics-side attachment area and between the second actuator-side attachment area and the second optics-side attachment area intersect at an angle of less than 180°; and
   wherein a course of the springs along the axial expansion comprises a curvature; wherein
   the spring runs within an area defined by circular arcs intersecting the first and the second end of the spring; wherein
   each circular arc comprises a radius that is greater than 0.75 times a distance between the first end and the second end of the spring; and wherein
   each circular arc comprises a center positioned along a line that is positioned perpendicular to a straight line connecting the first end and the second end of the spring to one another.

2. Apparatus according to claim 1, wherein
   the optical element is disposed between the first and the second actuator and the first spring is disposed on a deflectable end of the first actuator and the second spring is disposed on a deflectable end of the second actuator;
   wherein the first and second actuator extend in the same direction starting from a fixing, or the extension directions comprise a right angle.

3. Apparatus according to claim 1, wherein one of the springs comprises, between the first and second end, equal to or less than six portions that are straight in sections and are inclined with respect to an adjacent portion; wherein the portions comprise a different axial expansion along the spring course from the first to the second end of the spring, such that the spring comprises a long and at least one short portion;

the long portion comprises at least 80% of the overall axial expansion of the course of the spring; and each short portion comprises a proportion of the overall axial expansion of the course of the spring that is less than 4%.

4. Apparatus according to claim 1, wherein one of the springs comprises a lateral expansion that is constant across the axial course.

5. Apparatus according to claim 4, wherein the lateral expansion is less than the axial expansion multiplied by the factor 0.3.

6. Apparatus according to claim 1, wherein at least one further spring is disposed on an optics-side attachment point, and each of the springs comprises the same lateral expansion.

7. Apparatus to claim 1, wherein the lateral expansion of the springs varies across the axial course; wherein the lateral expansion is implemented within an area defined by circular arcs which intersect the first and the second end of the spring;

wherein each of the circular arcs comprises a radius that is greater than 0.75 times of a distance between the first end and the second end of the spring; and wherein each circular arc comprises a center positioned along a line that is positioned perpendicular to a straight line connecting the first end and the second end of the spring.

8. Apparatus according to claim 1, wherein a measurement element that is implemented to detect the deflection state of the actuators is disposed on an actuator.

9. Apparatus, comprising:

a first actuator;

a second actuator;

an optical element;

at least one first spring disposed between the first actuator and the optical element;

at least one second spring disposed between the second actuator and the optical element;

wherein the optical element comprises exactly two spaced-apart optics-side attachment areas; and wherein the at least one first spring is disposed on the first optics-side attachment area and the at least one second spring is disposed on the second optics-side attachment area, such that actuation of the first or second actuator causes tilting of the optical element around two axes;

wherein the lateral expansion of the springs varies across the axial course; wherein the lateral expansion is implemented within an area defined by circular arcs which intersect the first and the second end of the spring; wherein each of the circular arcs comprises a radius that is greater than 0.75 times of a distance between the first end and the second end of the spring; and wherein each circular arc comprises a center positioned along a line that is positioned perpendicular to a straight line connecting the first end and the second end of the spring.

* * * * *